F. H. Williams,
Stench Trap,
No. 81,719.           Patented Sept. 1, 1868.
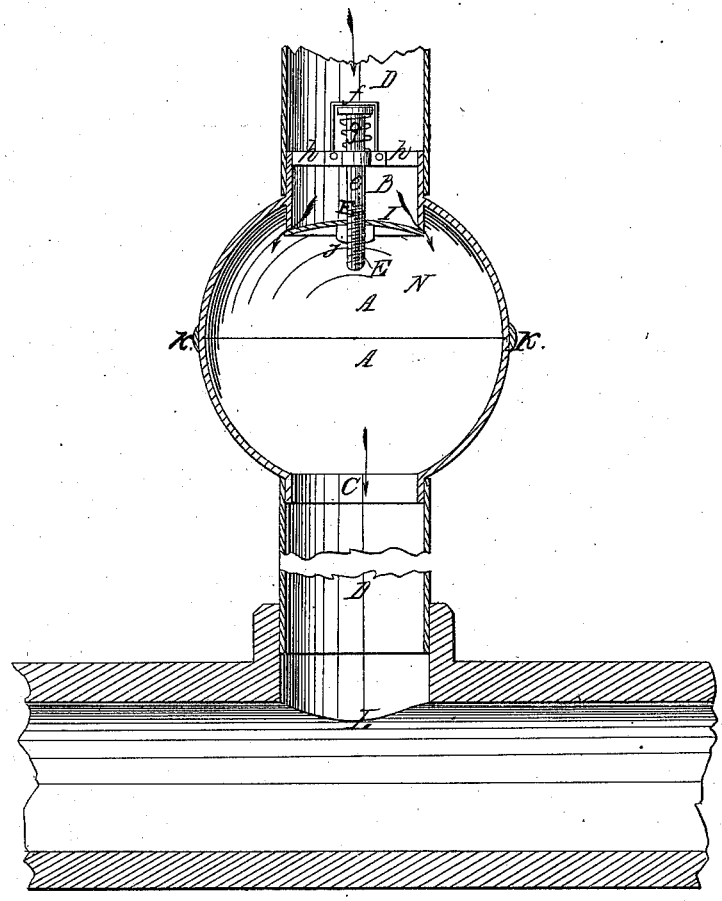

United States Patent Office.

FRANCIS H. WILLIAMS, OF SYRACUSE, NEW YORK.

Letters Patent No. 81,719, dated September 1, 1868.

---

IMPROVED STENCH-TRAP.

---

*The Schedule referred to in these Letters Patent and making part of the same.*

---

TO ALL WHOM IT MAY CONCERN:

Be it known that I, FRANCIS H. WILLIAMS, of Syracuse, in the county of Onondaga, and State of New York, have invented a new and improved Stench-Trap; and I do hereby declare that the following is a full, clear, and exact description thereof, reference being had to the accompanying drawing, making a part of this specification, in which—

Figure 1 is a sectional view, taken diametrically through the improved trap, and showing its connections with a waste-pipe and sewer.

This invention relates to certain novel improvements on sink-traps, which are designed to serve as means for preventing the rising of noxious gases from sinks, cess-pools, water-closets, and other conduits and receptacles for carrying off or retaining filth.

The nature of my invention consists in the application to a receiving or waste-pipe, leading into a sewer or other receptacle, of an enlarged valve-chamber, of a globular or other shape, which is constructed with collars upon opposite sides of it, adapted for receiving and holding the sections composing said receiving and waste-pipe, one of which collars is constructed so as to serve as a valve-seat and bridge-holder, for sustaining and keeping in place the stem of a spring-trap valve, as will be hereinafter explained.

The invention also consists in so constructing a spring-trap valve, and applying it to said valve-chamber, that the spring which acts to hold the valve to its seat shall be enclosed within an inverted cup, and protected from being clogged or rapidly destroyed by corrosion, as will be hereinafter explained.

I also provide for water-packing the trap-valve so as to effectually prevent the insinuation of gas through it. At the same time, this valve is allowed to open to permit the escape of liquids and other substances, when the pressure or weight upon it is greater than its spring will sustain.

Provision is also made for obtaining access to the interior of the valve-chamber for renewing or repairing the valve, and for cleaning out this chamber when necessary.

Provision is also made for preventing the accumulation of solid or liquid substances upon the valve, or within the collar against which the valve has its seat, all of which will be understood from the following description.

To enable others skilled in the art to understand my invention, I will describe its construction and operation.

In the accompanying drawing, D D represent two sections of waste-pipe, leading from a sink into a sewer, L, and connected to collars which are formed upon an enlarged valve-chamber, N. This valve-chamber may be made of any suitable capacity, and it is composed of two hemispherical sections A A, united by a lapped joint, at K, so that these sections can be separated when it is desired to have access to its interior. I prefer to construct the valve-chamber N of the spherical form shown in the drawing, as such form will not afford a lodgment for solid matters. Still, any other suitable form may be adopted.

The escape-opening through the bottom of the valve-chamber N is surrounded exteriorly by a collar, C, for receiving a lower section, D, of the waste-pipe, and allowing this pipe to be firmly secured to such section. Diametrically opposite the escape-hole is the inlet-hole, which is surrounded by a collar that extends both inside and outside of the said valve-chamber, as shown at B. The external portion of this collar or tube B is adapted for receiving and having secured to it the upper section, D, of the waste-pipe, and the internal portion of the collar B is adapted to serve as a valve-seat for a valve, I.

The valve I is constructed either flat or crowning, and is held up tightly against the lower end of the collar B, by means of a spring, g, which may be made of coiled wire or of India rubber, and which bears upon a bridge-bar, h, through which the valve-stem e passes freely. The bridge-bar h is secured diametrically across the upper end of the collar B, so as to hold the stem e, of the valve, centrally therein, and allow it to play up and down. In practice, I shall bevel the upper edge of the said bridge, so as to give it a knife-edge, for preventing a lodgment of solid matters upon it.

The upper end of the valve-stem e is enclosed by a cap or inverted cup, f, which is secured to the bridge bar $h$, so as to enclose the spring $g$, which holds the valve up to its seat. The upper end of the cup $f$ may be made conical or crowning, for the purpose of preventing solid matters from lodging upon it.

It is intended to have the valve I held up to its seat by the spring $g$, with a force which will allow a small quantity of liquid to remain in the collar B, above the valve, in order to form a water-packing, but if the weight of liquid above the valves exceed a given amount, then it is intended that the valve shall open and allow the liquid to escape into chamber N.

The cup $f$ is intended to serve as a means for preventing substances from clogging the spring $g$ and valve-stem, and also to form an air-chamber, to prevent liquid from rising in it and corroding the spring and upper part of the valve-stem.

Having described my invention, what I claim as new, and desire to secure by Letters Patent, is—

1. A valve-chamber, N, which is constructed with a tubular valve-seat, B, and a pipe-connecting collar, C, substantially as and for the purposes described.

2. The construction of valve-chamber N, of sections A A, one of which has an internally and externally-projecting collar, B, and the other an externally-projecting collar, C, substantially as and for the purposes described.

3. Valve I, applied to the inner end of collar B, and held up to its seat by a spring, $g$, which rests upon a bridge, $h$, applied to the upper end of said collar, in combination with the chamber N, substantially as described.

4. The inverted cup $f$, applied over the upper end of valve-stem $e$, so as to protect the spring $g$, substantially as described.

5. A crowning or convex valve I, which is suspended by a spring, $g$, and applied to a collar, B, of the chamber N, substantially as described.

F. H. WILLIAMS.

Witnesses:
    LOUIS F. SMITH,
    R. A. BONTA.